(12) United States Patent
Motta (10) Patent No.: US 8,619,143 B2
(45) Date of Patent: Dec. 31, 2013

(54) IMAGE SENSOR INCLUDING COLOR AND INFRARED PIXELS

(75) Inventor: Ricardo J. Motta, Palo Alto, CA (US)

(73) Assignee: PIXIM, Inc., Mountain View, CA (US)

( * ) Notice: Subject to any disclaimer, the term of this patent is extended or adjusted under 35 U.S.C. 154(b) by 923 days.

(21) Appl. No.: 12/727,603

(22) Filed: Mar. 19, 2010

(65) Prior Publication Data
US 2011/0228097 A1   Sep. 22, 2011

(51) Int. Cl.
*H04N 5/33*   (2006.01)
(52) U.S. Cl.
USPC .............................. 348/164; 348/166; 348/162
(58) Field of Classification Search
None
See application file for complete search history.

(56) References Cited

U.S. PATENT DOCUMENTS

| | | | |
|---|---|---|---|
| 6,515,275 | B1 | 2/2003 | Hunter et al. |
| 7,483,058 | B1 * | 1/2009 | Frank et al. ................ 348/222.1 |
| 2002/0044209 | A1 * | 4/2002 | Saito ............................ 348/280 |
| 2005/0231618 | A1 | 10/2005 | Sugiyama |
| 2007/0024879 | A1 | 2/2007 | Hamilton, Jr. et al. |
| 2007/0145273 | A1 | 6/2007 | Chang |
| 2007/0272836 | A1 | 11/2007 | Higashitsutsumi et al. |

FOREIGN PATENT DOCUMENTS

| | | |
|---|---|---|
| FR | 2929477 A1 * | 10/2009 |
| JP | 2002320139 A | 10/2002 |
| WO | 2007136061 A1 | 11/2007 |

OTHER PUBLICATIONS

European Search Report, 8 pages.
Songtao Huang et al., "A RGBI Imager Based Background Suppression Method," 2008 IEEE Intelligent Vehicles Symposium, Eindhoven University of Technology, Eindhoven, The Netherlands, Jun. 4-6, 2008, pp. 643-647.

* cited by examiner

*Primary Examiner* — Andy Rao
*Assistant Examiner* — Tyler Edwards
(74) *Attorney, Agent, or Firm* — Rader, Fishman & Grauer PLLC (57) ABSTRACT

An image sensing system includes an IR notch filter configured to block transmission of spectral energy having wavelengths in an interface region between the visible and the invisible spectra and enable transmission of spectral energy having wavelengths in at least the visible spectrum and the near-infrared (IR) spectrum, a digital image sensor including a two-dimensional array of pixel elements and configured to generate output signals at each pixel element as pixel data representing an image of a scene, and a color filter array including a two-dimensional array of selectively transmissive filters superimposed on and in registration with the two-dimensional array of pixel elements. The color filter array includes a first group of selectively transmissive filters disposed to transmit spectral energy in one or more colors of the visible spectrum and a second group of gray color filters disposed to transmit spectral energy in at least the near-infrared (IR) spectrum.

25 Claims, 11 Drawing Sheets

| R | G | R | G |
|---|---|---|---|
| G | B | G | B |
| R | G | R | G |
| G | B | G | B |

FIG. 1
(Prior Art)

| R | Gr | R | Gr |
|---|----|---|----|
| G | B  | G | B  |
| R | Gr | R | Gr |
| G | B  | G | B  |

FIG. 17

IMAGE SENSOR INCLUDING COLOR AND INFRARED PIXELS

FIELD OF THE INVENTION

The invention relates to digital imaging systems and, in particular, to a digital imaging system incorporating an image sensor responsive to both the visible light and the near-infrared spectral energy.

DESCRIPTION OF THE RELATED ART

A digital imaging system for still or motion images uses an image sensor or a photosensitive device that is sensitive to a broad spectrum of light to capture an image of a scene. The photosensitive device reacts to light reflected from the scene and can translate the strength of that light into electronic signals that are digitized. Generally, an image sensor includes a two-dimensional array of light detecting elements, also called pixels, and generates electronic signals, also called pixel data, at each light detecting element that are indicative of the intensity of the light impinging upon each light detecting element. Thus, the sensor data generated by an image sensor is often represented as a two-dimensional array of pixel data.

Figure 1:
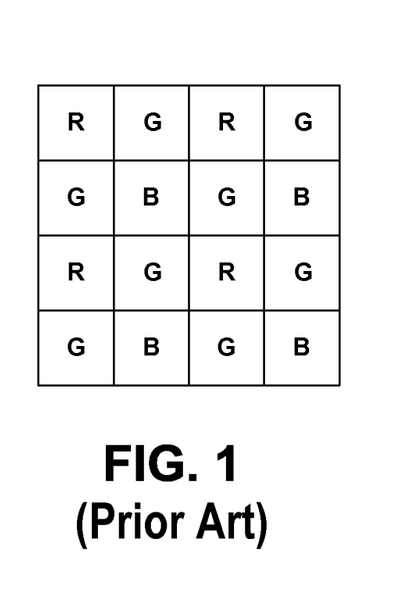
FIG. 1 illustrates a conventional four-color Bayer pattern for a color filter array.

To capture a color image, a pattern of selectively transmissive filters, called a color filter array, is laid on top of the image sensor so that different groups of pixels are made to sense different spectrum of the visible light (such as red, green and blue). The most commonly used color filter array pattern is the "Bayer pattern" described in U.S. Pat. No. 3,971,065 to Bayer which includes individual luminance and chrominance sensing elements. For example, a four-color Bayer pattern is formed by two green filters as the luminance sensing elements, and one red filter and one blue filter as the chrominance sensing elements, as shown in FIG. 1. Each color filter is superimposed on a corresponding pixel of the image sensor so that each pixel in the image sensor becomes a red pixel, a green pixel or a blue pixel. The Bayer pattern of FIG. 1 mimics the relative sensitivity of the human eye to the red, blue and green frequency bands in the visible color spectrum where the human eye is more sensitive to the green band than the red or blue band.

In an image sensor superimposed with a color filter array, each pixel location is disposed to sample only one color component of the scene. Therefore, at each pixel location, pixel values for the other color components are missing. However, a full color image is usually represented by three set of pixel values, one set of pixel values for each of the three primary colors (such as red, green and blue) at every pixel location. Therefore, to create a full color picture, an interpolation process is performed amongst the pixels to interpolate pixel values of the missing color components at each pixel location. The interpolation process operates on the pixel data in the pixel array which includes pixel data of different colors sampled at different pixel locations and determines the missing pixel values so that each pixel location in the pixel array is represented by pixel values in all three color planes (e.g. red, green and blue) to form the full color image.

Techniques for performing interpolation, sometimes referred to as "demosaicing," are known in the art. For example, U.S. Pat. Nos. 4,642,678 to Cok, 5,373,322 to Laroche et al., and 5,475,769 to Wober et al. describe various methods for recovering missing pixel values from sampled color image data. The Wober patent describes a common approach using a convolution kernel to compute missing pixel values for each pixel location based on the pixel values of a neighborhood of pixels surrounding each pixel location.

Figure 2:
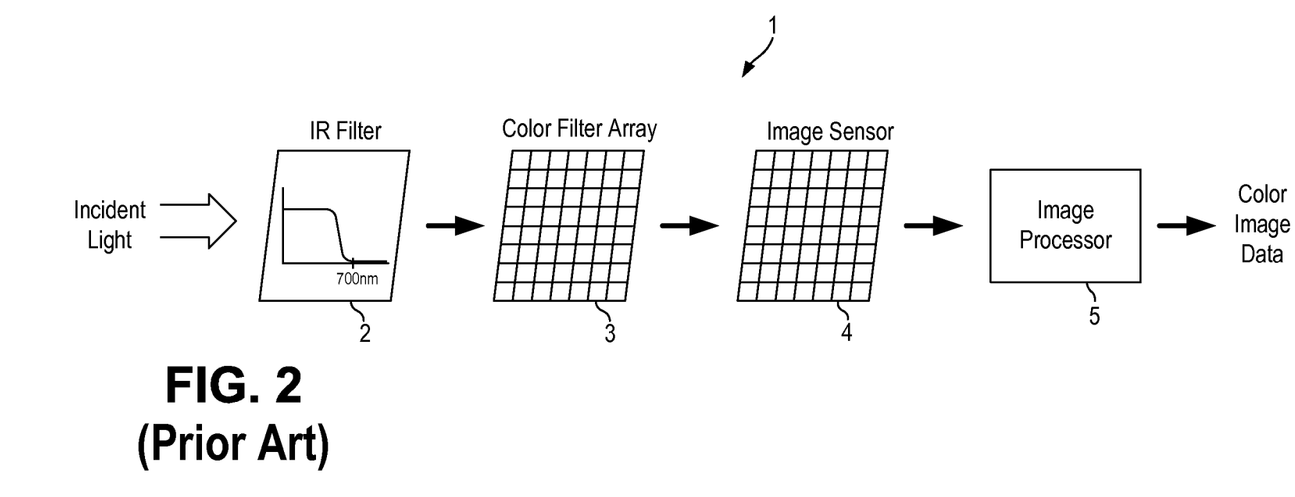
FIG. 2 is a schematic diagram illustrating the components of a conventional digital imaging system.

FIG. 2 is a schematic diagram illustrating the components of a conventional digital imaging system. Referring to FIG. 2, digital imaging system 1 includes an infrared (IR) filter 2 and a color filter array 3 superimposed on an image sensor 4. Image sensor 4, which can be a CMOS or CCD image sensor, generates pixel data that are provided to an image processor 5 for processing. Image processor 5 generates the final full color image data indicative of the incident light.

Image sensor 4 superimposed with color filter array 3 is responsive to spectral energy in the visible spectrum as well as the infrared (IR) frequency band in the invisible spectrum. This is because the conventional color filters in the color filter array 3 passes IR spectral energy in addition to the spectral energy of the intended color band. The additional IR energy passed along with the spectral energy of each color band often corrupts the color signal, resulting in color distortion.

Therefore, conventional digital imaging systems include a blanket IR filter 2 between the incident light and the color filter array 3 to remove the infrared energy before the light reaches the color filter array 3. Blanket IR filter 2 is applied to the entire image sensor 4 and has transmittance characteristics that blocks wavelengths above around 700 nm (the beginning of the near-IR range). However, both the IR filter and the color filter array are not perfect and a certain amount of energy is lost as light passes through the filters. Consequently, color image sensor usually has poor performance in low light conditions.

SUMMARY OF THE INVENTION

According to one embodiment of the present invention, an image sensing system includes an IR notch filter configured to block transmission of spectral energy having wavelengths in an interface region between the visible spectrum and the invisible spectrum and enable transmission of spectral energy having wavelengths in at least the visible spectrum and the near-infrared (IR) spectrum, an image sensor including a two-dimensional array of pixel elements where the image sensor is configured to generate output signals at each pixel element as pixel data representing an image of a scene, and a color filter array including a two-dimensional array of selectively transmissive filters superimposed on and in registration with the two-dimensional array of pixel elements. The color filter array includes a first group of selectively transmissive filters disposed to transmit spectral energy in one or more colors of the visible spectrum and a second group of gray color filters disposed to transmit spectral energy in at least the near-infrared (IR) spectrum.

According to another embodiment of the present invention, a digital imaging system includes an IR notch filter configured to block transmission of spectral energy having wavelengths in an interface region between the visible spectrum and the invisible spectrum and enable transmission of spectral energy having wavelengths in at least the visible spectrum and the near-infrared (IR) spectrum, an image sensor including a two-dimensional array of pixel elements where the image sensor is configured to generate output signals at each pixel element as pixel data representing an image of a scene, a color filter array including a two-dimensional array of selectively transmissive filters superimposed on and in registration with the two-dimensional array of pixel elements where the color filter array includes a first group of selectively transmissive filters disposed to transmit spectral energy in one or more colors of the visible spectrum and a second group of gray color filters disposed to transmit spectral energy in at least the near-infrared (IR) spectrum, a data memory in communication with the image sensor and configured to store the pixel data, and a digital image processor in communication with the image sensor and the data memory and configured to process the pixel data to generate image data indicative of the image of the scene.

According to yet another embodiment of the present invention a method for sensing an image of a scene includes receiving incident light at a digital image sensing system, blocking transmission of spectral energy having wavelengths in an interface region between the visible spectrum and the invisible spectrum while enabling transmission of spectral energy having wavelengths in at least the visible spectrum and the near-infrared (IR) spectrum, sensing the incident light at an image sensor overlaid with a color filter array, and generating output signals at each pixel element of the image sensor as pixel data representing an image of a scene. The method further includes sensing the incident light using a first group of selectively transmissive filters disposed to transmit spectral energy in one or more colors of the visible spectrum and sensing the incident light using a second group of gray color filters disposed to transmit spectral energy in at least the near-infrared (IR) spectrum.

The present invention is better understood upon consideration of the detailed description below and the accompanying drawings.

DETAILED DESCRIPTION OF THE PREFERRED EMBODIMENTS

In accordance with the principles of the present invention, a digital image sensing system incorporates an IR notch filter and a color filter array pattern superimposed on an image sensor where the color filter array pattern includes one or more color filters for sensing the visible color spectrum and at least one gray filter for sensing the invisible infrared (IR) spectrum. The use of the IR notch filter and the gray color filter in the color filter array enable the capture of IR information in the incident light without loss in edge resolution of the captured image. The IR information of the captured image can be processed independently through image processing to provide a separate IR image of the scene or to use in correcting the color signals of the captured image.

More specifically, the IR notch filter passes both the visible and invisible spectra but blocks transmission at the region where the visible and invisible spectra meet. The IR notch filter realizes the particular advantage of eliminating noisy signals in the interface region of the visible and invisible spectra (around 700 nm wavelength) to ensure cleaner and more robust IR information in the captured image.

In one embodiment, the color filters for the visible spectrum include one red, one green and one blue filter. The red, green and blue color filters together with the gray filter form a regular color filter array pattern referred herein as the RGBGr color filter array pattern. Furthermore, in one embodiment, the gray color filter is fabricated using the same materials as the red, blue and green color filters so that the gray color filter can be fabricated using the same manufacturing process and exhibits the same performance characteristics as the red/green/blue color filters.

The RGBGr color filter array pattern of the present invention provides many advantages over conventional RGB color filter array pattern. First, while a black color filter is completely transparent to IR, the RGBGr color filter array of the present invention uses a gray color filter for detecting incident IR transmission. By using a gray color filter, IR transmission can be detected without losing edge resolution in the captured images. Second, when superimposed on an image sensor to form an RGBGr image sensor, the RGBGr image sensor improves the performance of the image sensor in low light conditions by using the IR information to enhance the RGB color image. Lastly, the IR information can be individually processed to allow the IR image to be used for materials classification, depth perception, and ambient light rejection.

Digital Imaging System

Figure 3:
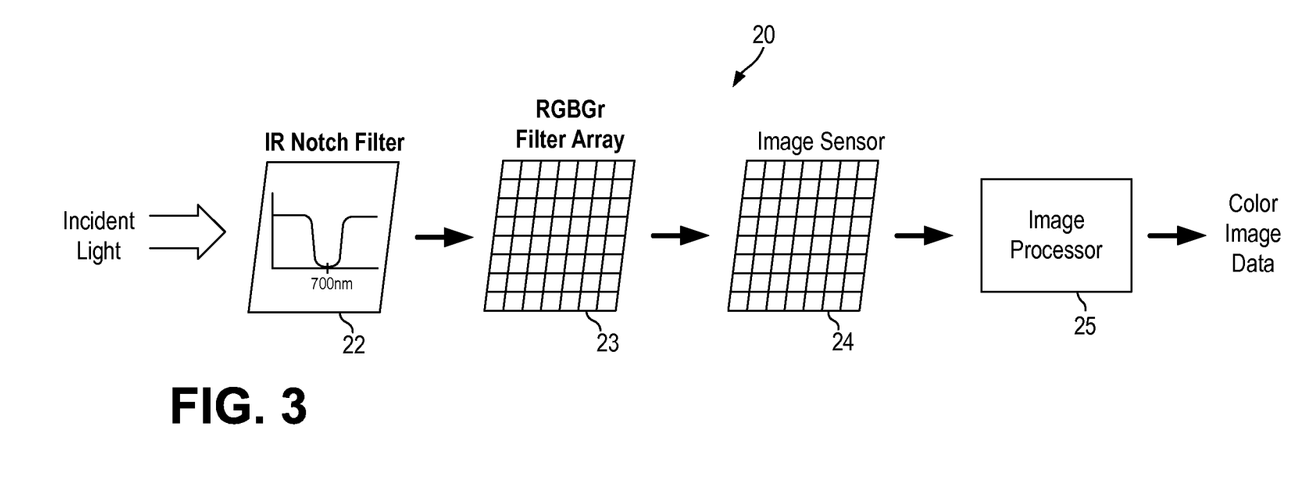
FIG. 3 is a schematic diagram illustrating the components of a digital imaging system incorporating an IR notch filter and a RGBGr color filter array according to one embodiment of the present invention.

FIG. 3 is a schematic diagram illustrating the components of a digital imaging system incorporating the RGBGr color filter array according to one embodiment of the present invention. Referring to FIG. 3, digital imaging system 20 includes a blanket IR notch filter 22 and an RGBGr color filter array 23 superimposed on an image sensor 24. Image sensor 24, which can be a CMOS or CCD image sensor, generates pixel data that are provided to an image processor 25 for processing. Image processor 25 generates the final full color image data indicative of the incident light. The combination of RGBGr color filter array 23 and image sensor 24 will be referred hereinafter as an "RGBGr image sensor."

In the digital imaging system 20 of the present invention, a novel IR notch filter 22 replaces the conventional IR filter. The IR notch filter 22 has a transmittance characteristic that passes both the visible and invisible spectra but blocks transmission at the interface region between the visible and invisible spectra, i.e., around 700 nm. In one embodiment, the IR notch filter also blocks wavelengths above about 1000 nm, as will be discussed in more detail below. By blocking only the wavelengths in the interface region, and using a gray filter that is a linear combination of the other RGB filters, the infrared signal can be accurately predicted using a 4×4 matrix, or other estimation methods.

Figure 4:
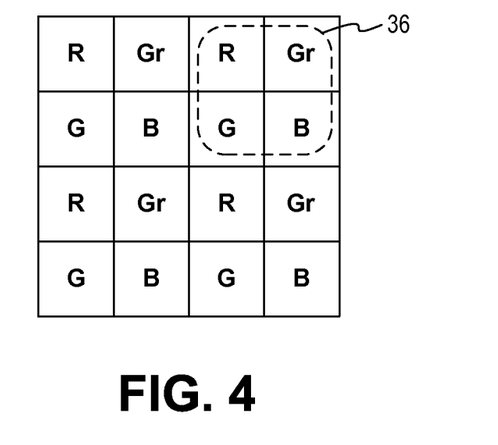
FIG. 4 illustrates a color filter array pattern for detecting the visible spectrum and the near-infrared spectrum according to one embodiment of the present invention.

FIG. 4 illustrates a color filter array pattern for detecting the visible spectrum and the near-infrared spectrum according to one embodiment of the present invention. In one embodiment, RGBGr color filter array 23 in digital imaging system 20 of FIG. 3 is formed using the color filter array pattern of FIG. 4. Referring to FIG. 4, the color filter array pattern includes a block 36 of a red filter (R), a green filter (G), a blue filter (B) and a gray filter (Gr) to form a square pixel block. The pixel block 36 of 2×2 pixels forms a repeating unit which is repeated to form a color filter array of the desired size to be superimposed on the pixel array of an image sensor. The pixel block 36 forms an RGBGr color filter array pattern. The RGBGr color filter array pattern differs from the Bayer pattern in FIG. 1 in that one of the green filter in the Bayer pattern is replaced by a gray filter.

The arrangement of luminance and chrominance sensing elements and the gray color IR filter in pixel block 36 is illustrative only. In other embodiments, the color filter array pattern can be implemented with luminance and chrominance sensing elements of other colors for sensing the visible light spectrum, such as cyan, yellow, and magenta. Furthermore, the configuration or arrangement of the four color filters to form pixel block 36 in FIG. 4 is illustrative only. Other arrangements of the four color filters can be used in other embodiments of the present invention.

It is instructive to note that the use of IR filter in an image sensor has been described in the prior art, such as U.S. Pat. No. 6,515,275 to Hunter. However, the prior art methods for detecting IR use either a transparent pixel which allows the entire electromagnetic spectrum (EM) to pass or an IR filter that only allows IR light to pass (such as a black pixel). When a transparent filter is used without a notch filter as in the conventional methods, the separation of the sensor data into R, G, B, and IR images is near impossible because of the noise in the interface region between visible and IR. When a black pixel is used, the IR could be correctly estimated, but the edge resolution in the image is often lost. To the contrary, the color filter array of the present invention uses a gray pixel which is not just a transparent pixel or just a black pixel. In this manner, edge resolution is not lost. The nature of the gray color filter for IR detection in the RGBGr image sensor of the present invention will be described in more detail below.

IR Notch Filter

Figure 5:
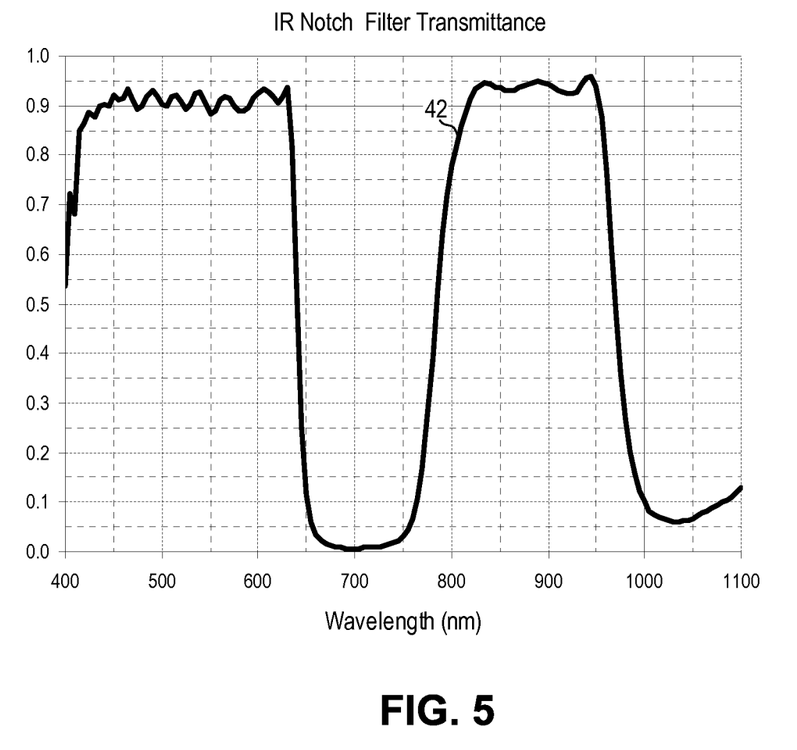
FIG. 5 is a plot illustrating the transmittance characteristics of an IR notch filter according to one embodiment of the present invention.

In accordance with embodiments of the present invention, the digital imaging system incorporates an IR notch filter to enable IR transmission while blocking noisy transmission in the visible/invisible interface region. FIG. 5 is a plot illustrating the transmittance characteristics of an IR notch filter according to one embodiment of the present invention. Referring to FIG. 5, the IR notch filter (curve 42) transmits in the visible spectrum from 400 nm to 650 nm and in the invisible spectrum from about 780 nm to 950 nm. The IR notch filter blocks transmission between 650 nm to 780 nm, forming a notch in the transmittance characteristics. By blocking transmittance between the end of the visible spectrum and the beginning of the invisible spectrum, a definitive isolation of the IR transmittance is realized. The IR notch filter with the notched transmittance characteristics provides improved IR detection by blocking wavelength in the noisy interface region so that IR transmission can be better isolated.

In the present embodiment, the IR notch filter also blocks transmission above 950 nm. Wavelengths near the end of the near-IR region are thus blocked. Blocking of wavelengths above the near-IR region (that is, above 950 nm or 1000 nm) is optional and may be omitted in other embodiments of the present invention.

RGBGr Color Filter Array

Figure 6:
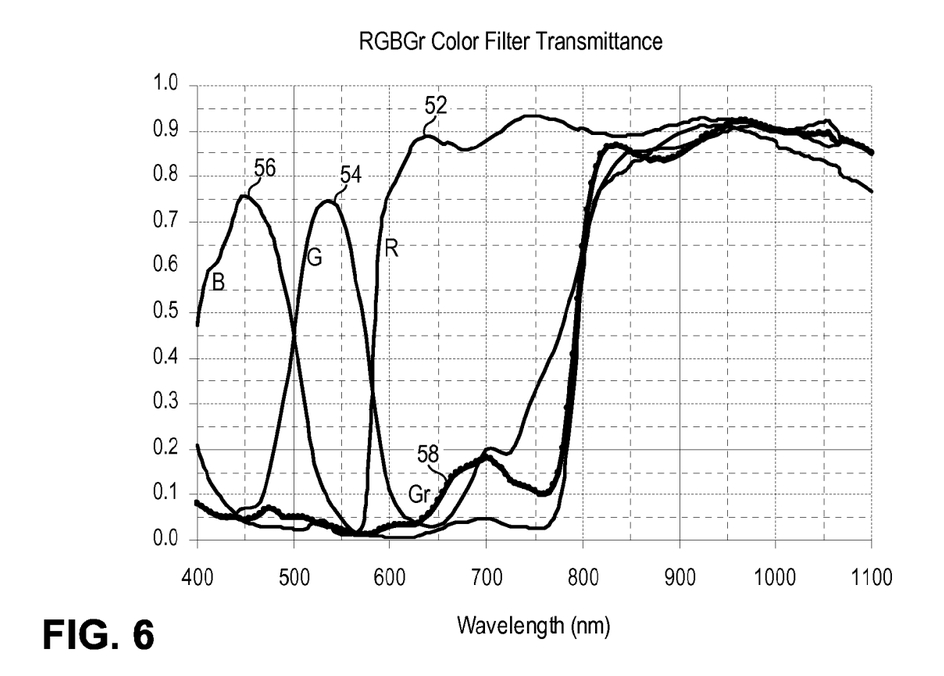
FIG. 6 illustrates the transmittance characteristics of red, green and blue color filters and a gray color filter according to one embodiment of the present invention.

In accordance with embodiments of the present invention, the digital imaging system uses a gray color filter in the color filter array to sense IR energy in the incident light. In one embodiment, the gray color filter is formed as a linear combination of the conventional red, green and blue color filters. FIG. 6 illustrates the transmittance characteristics of red, green and blue color filters and a gray color filter according to one embodiment of the present invention. Referring to FIG. 6, the blue color filter (curve 56) transmits in the wavelength range of 400-500 nm and above 800 nm, the green color filter (curve 54) transmits in the wavelength range of 500-600 nm and above 800 nm and the red color filter (curve 52) transmits in the wavelength range of 600 nm and above. The red, green, and blue color filters illustrated in FIG. 6 are conventional color filters. As mentioned above, the conventional RGB color filters pass the spectral energy of the intended color band as well as IR radiation in the invisible band (i.e., wavelengths of 700 nm and more). Thus, as shown in FIG. 6, each of the RGB color filters transmits in the IR range of wavelengths above 800 nm as well as in their individual color bands.

In conventional imaging systems, such as system 1 in FIG. 2, the unwanted IR transmission is blocked by a blanket IR filter as the additional IR energy passed along with the spectral energy of each color band often corrupts the color signal, resulting in color distortion. However, in accordance with embodiments of the present invention, the digital imaging system employs a novel notch IR filter, such as one with the transmittance characteristics shown in FIG. 5, to permit incident light transmission in the visible and the IR range, blocking only transmission in the interface region.

The gray color filter in the color filter array is provided to sense the IR spectrum in the incident light. In one embodiment, the gray color filter is formed using the same materials as the RGB color filters and is further formed as a linear combination of the red, green and blue color filters. In one embodiment, the gray filter correlates to 30% intensity of the individual RGB color filters. By allowing 30% transmittance of the visible spectrum in the IR filter, edges resolution in the final color images is preserved. FIG. 6 illustrates the transmittance characteristics of a gray color filter (curve 58) which provides limited transmissions in the blue, green and red color range but passes wavelengths in the IR range above 800 nm.

Figure 7:
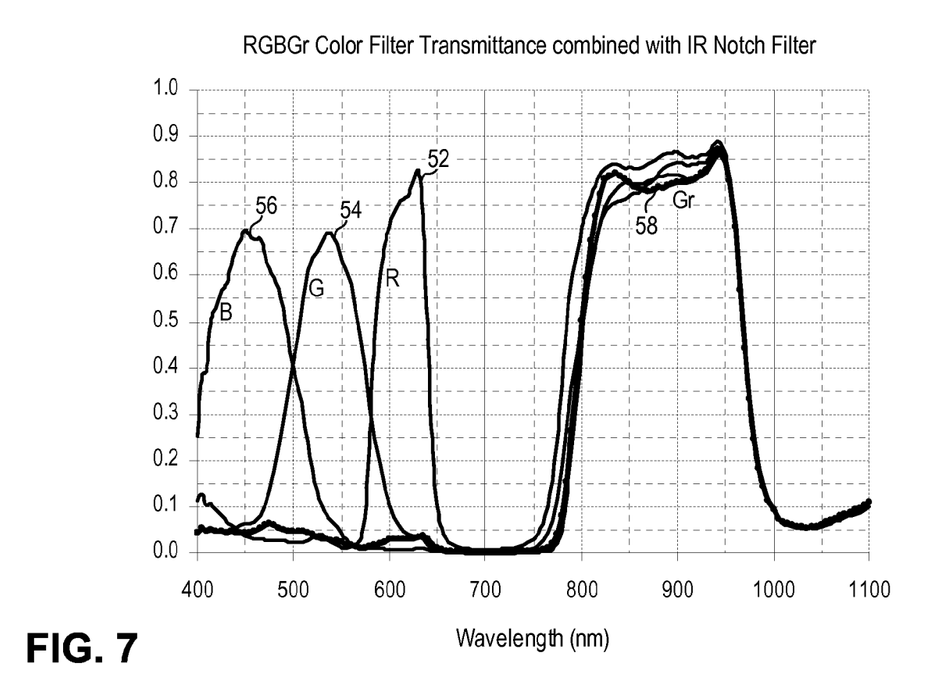
FIG. 7 illustrates the transmittance characteristics of the red, green, blue and gray color filters combined with the IR notch filter according to one embodiment of the present invention.

When the RGBGr color filter array is working cooperatively with the IR notch filter, the IR notch filter operates to suppress transmission between the wavelengths of 650 nm to 780 nm, in the vicinity of the end of the red spectrum and the beginning of the near-infrared spectrum, resulting in clearly delineated detection of the visible spectrum versus the invisible spectrum. FIG. 7 illustrates the transmittance characteristics of the red, green, blue and gray color filters combined with the IR notch filter according to one embodiment of the present invention. With the IR notch filter suppressing transmission between the wavelengths of 650 nm to 780 nm, in the vicinity of the end of the red spectrum and the beginning of the near-infrared spectrum, a definite delineation between the red spectral energy and the near-infrared spectral energy results, thereby enhancing the IR detection. The gray color filter (curve 58) senses predominately the IR transmission and can be used to provide IR information of the incident light.

Figure 8:
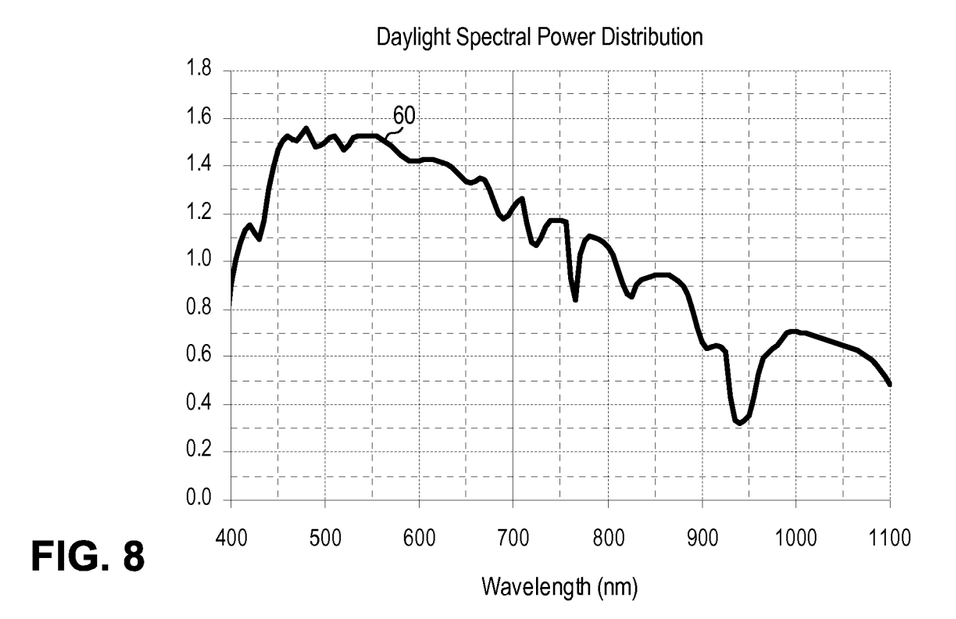
FIG. 8 illustrates the spectral power distribution of daylight, that is, a light source from sunlight.
Figure 9:
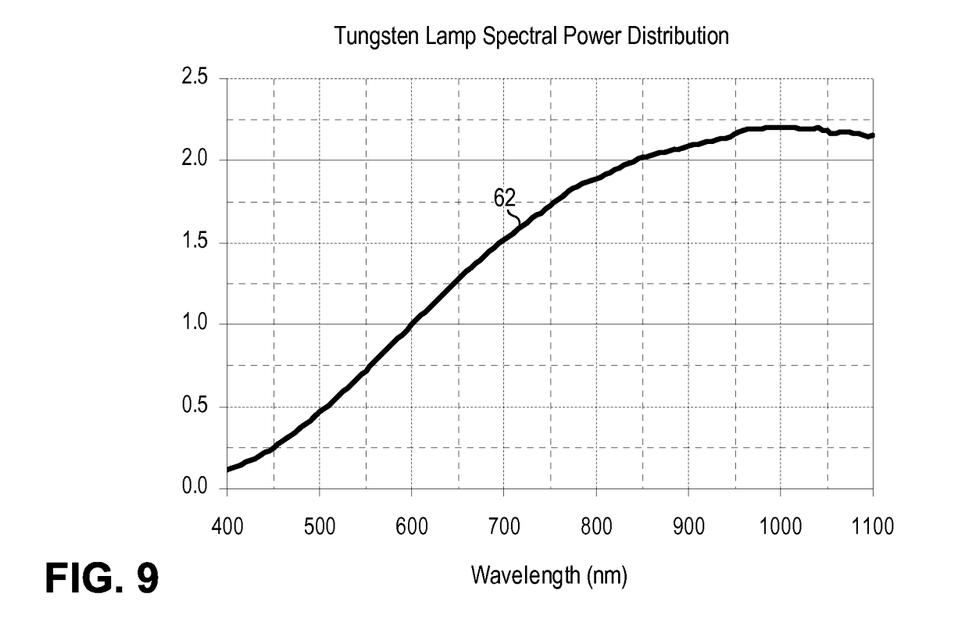
FIG. 9 illustrates the spectral power distribution of a tungsten light source.
Figure 10:
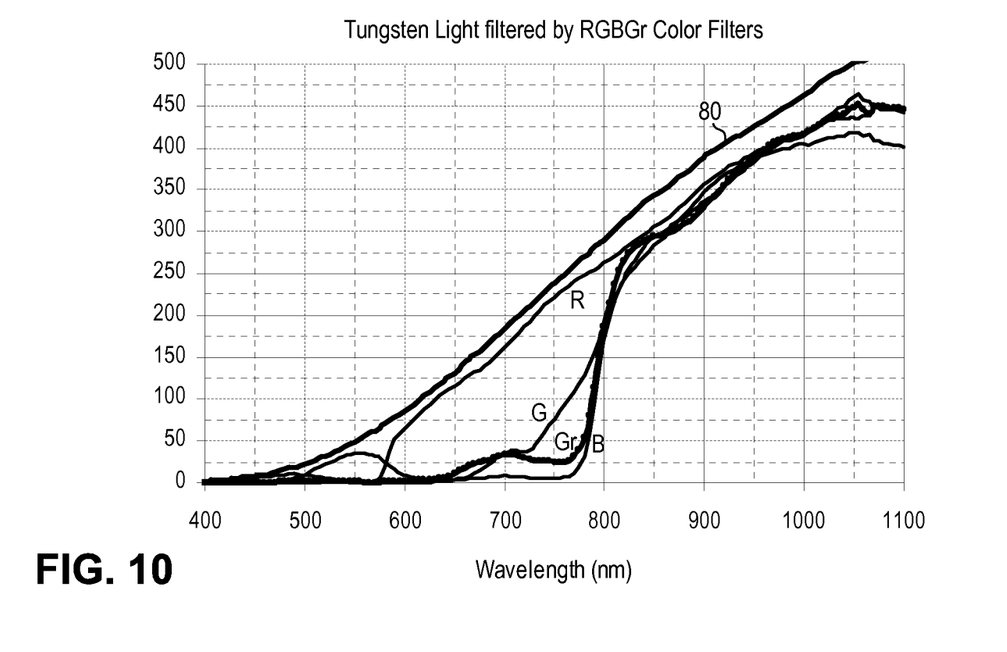
FIG. 10 illustrates the transmission characteristics of tungsten light through the RGBGr color filters.

The advantage of suppressing transmission at the interface region of the visible/invisible spectrum (wavelengths of 650 nm to 780 nm) using the IR notch filter will become apparent in the description below with reference to the detection of emissions from an artificial light source. FIG. 8 illustrates the spectral power distribution of daylight, that is, a light source from sunlight. As shown in FIG. 8, daylight contains little IR radiation and instead contains energy predominately in the visible spectrum. FIG. 9 illustrates the spectral power distribution of a tungsten light source. In an artificial light source such as tungsten lamp, there is a large amount of IR radiation as shown in FIG. 9. FIG. 10 illustrates the transmission characteristics of tungsten light through the RGBGr color filters. Curve 80 represents the resultant transmission with most of the IR spectral energy passing through RGBGr color filters.

Figure 11:
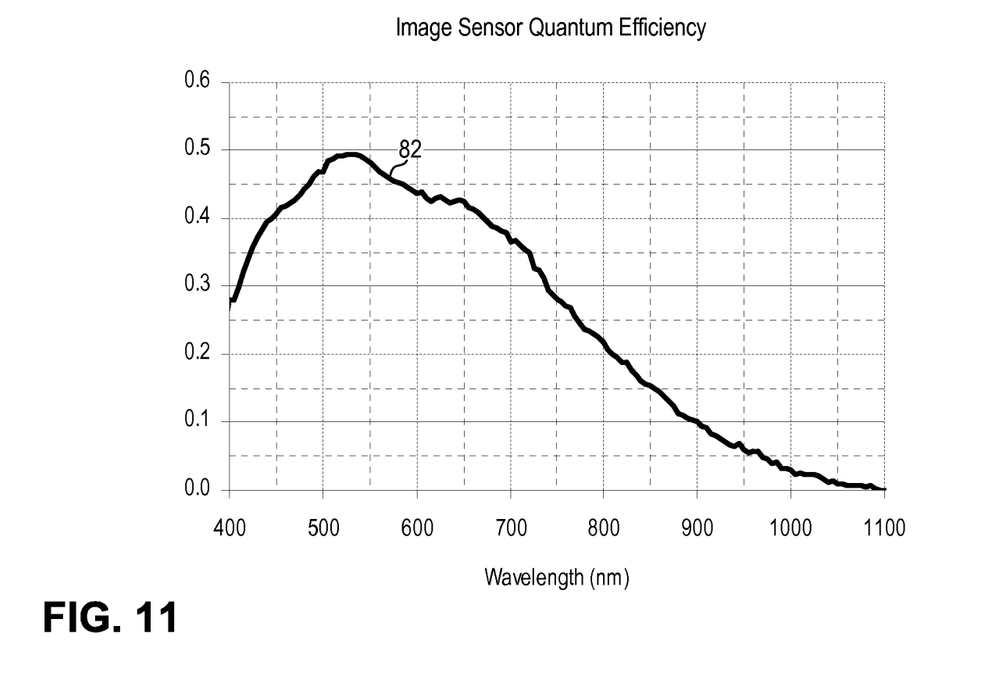
FIG. 11 illustrates the quantum efficiency (QE) of a conventional CMOS image sensor.
Figure 12:
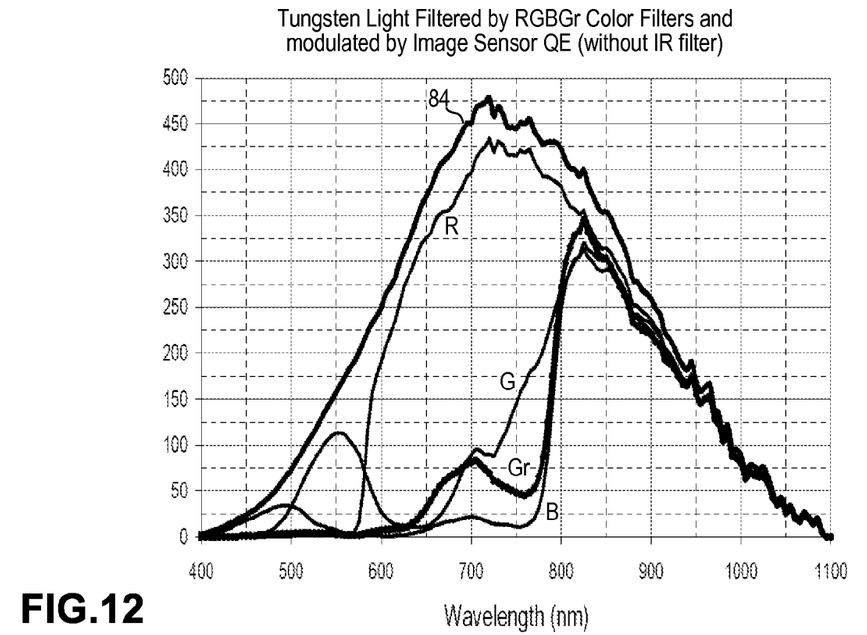
FIG. 12 illustrates the transmission characteristics of tungsten light through the RGBGr color filters without any IR filter and modulated by the QE of the image sensor.

The actual transmission of the IR radiation in tungsten light is also affected by the quantum efficiency (QE) of the image sensor. Quantum efficiency refers to the efficiency with which a photodiode converts incident photons into electrons. QE is dependant on the wavelength of the incident light with some wavelengths being more efficient than others. FIG. 11 illustrates the quantum efficiency of a conventional CMOS image sensor. As can be observed from FIG. 11, the quantum efficiency of the image sensor drops off significantly in the IR spectral region. When the QE of the image sensor is taken into consideration, the transmission of tungsten light through the conventional RGB color filters becomes limited in the IR region. FIG. 12 illustrates the transmission characteristics of tungsten light through the RGBGr color filters without any IR filter and modulated by the QE of the image sensor. As shown in FIG. 12, even though the RGB color filter passes the IR transmission, the IR transmission (curve 84) is reduced due to the QE of the image sensor.

Figure 13:
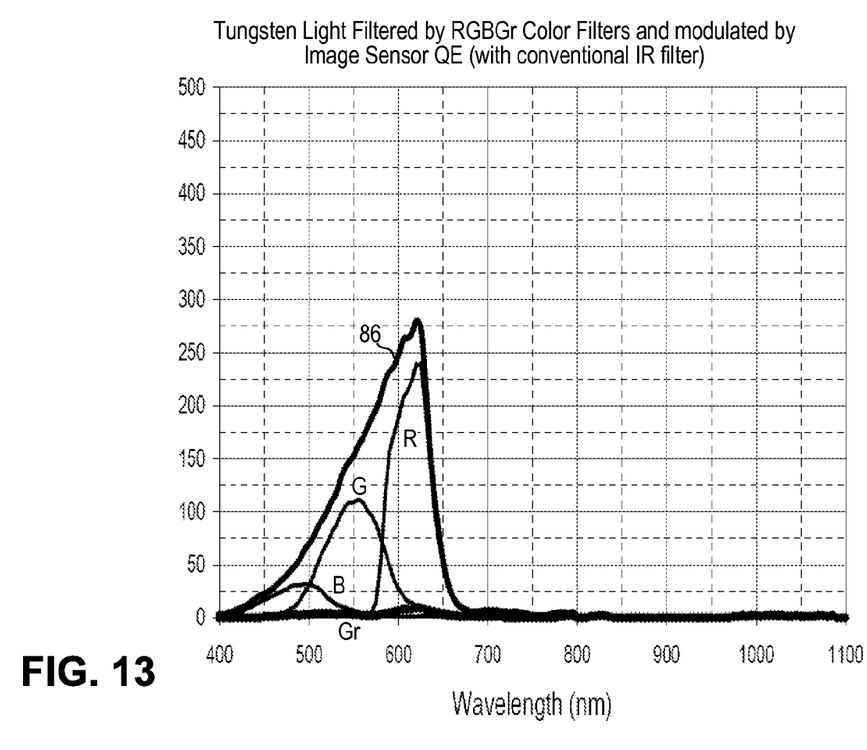
FIG. 13 illustrates the transmission characteristics of tungsten light through the RGBGr color filters and modulated by the QE of the image sensor when the conventional IR filter is used.

In conventional digital imaging systems, a blanket IR filter is employed. Then the transmission of tungsten light through such a conventional digital imaging system is severely limited as all of the IR spectral energy will be cutoff and only a small amount of spectral energy in the visible spectrum passes through, as shown in FIG. 13. FIG. 13 illustrates the transmission characteristics of tungsten light through the RGBGr color filters and modulated by the QE of the image sensor when the conventional IR filter is used. Referring to FIG. 13, transmission (curve 86) above the 650 nm is cut off by the blanket IR filter, leaving limited transmission in the visible spectrum. Therefore, the conventional digital imaging system with the conventional RGB color filters operates poorly in low light conditions.

Figure 14:
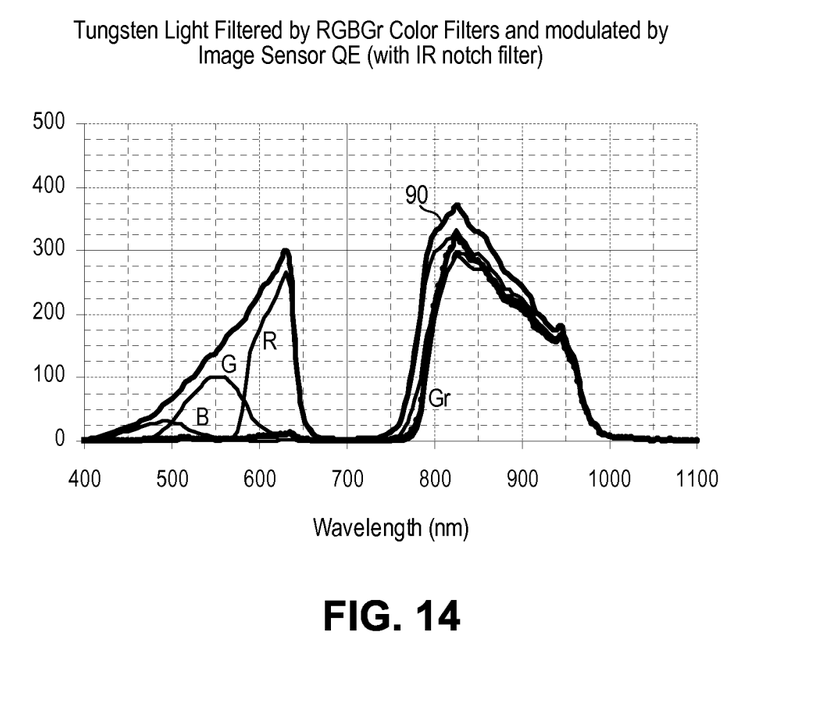
FIG. 14 illustrates the transmission characteristics of tungsten light through the RGBGr color filters and modulated by the QE of the image sensor when the IR notch filter is used.

On the other hand, in the digital imaging system of the present invention, an IR notch filter is used instead of a conventional IR filter, the IR notch filter enables transmission of the IR radiation of the tungsten light in wavelengths over 780 nm. When the IR notch filter is used in combination with the RGBGr image sensor, more spectral energy is allowed to reach the image sensor. FIG. 14 illustrates the transmission characteristics of tungsten light through the RGBGr color filters and modulated by the QE of the image sensor when the IR notch filter is used. As shown by curve 90 in FIG. 14, the portion of the tungsten light in the visible spectrum is transmitted and the portion of the tungsten light in the IR spectrum above 780 nm is transmitted. In this manner, even in low light conditions, a large amount of the spectral energy of the tungsten light is still transmitted through the RGBGr color filter array. Thus, the RGBGr image sensor of the present invention enables imaging in low light conditions.

Another important advantage of the IR notch filter is that it removes transmissions in the visible/invisible spectra interface which often contain noisy signals that can corrupts the desired color and IR signals. Comparing the transmission spectrum 84 of FIG. 12 with no IR filtering and the transmission spectrum 90 of FIG. 14 with IR notch filtering, the signals at the interface between the visible and invisible bands is suppressed so that more robust RGB color signals and IR signal can be obtained.

System Implementation

In one embodiment, a image sensor incorporating the RGBGr color filter array of the present invention is implemented using a high dynamic range digital image sensor architecture with square progressive pixels to realize high dynamic range imaging. Furthermore, in another embodiment, the RGBGr image sensor is incorporated in a digital imaging system capable of high numeric accuracy in image processing. In yet another embodiment, the digital imaging system incorporates an image processor implementing four channel demosaicing in the image pipeline. In this manner, the RGB image and the IR image can be processed independently of each other.

Figure 15:
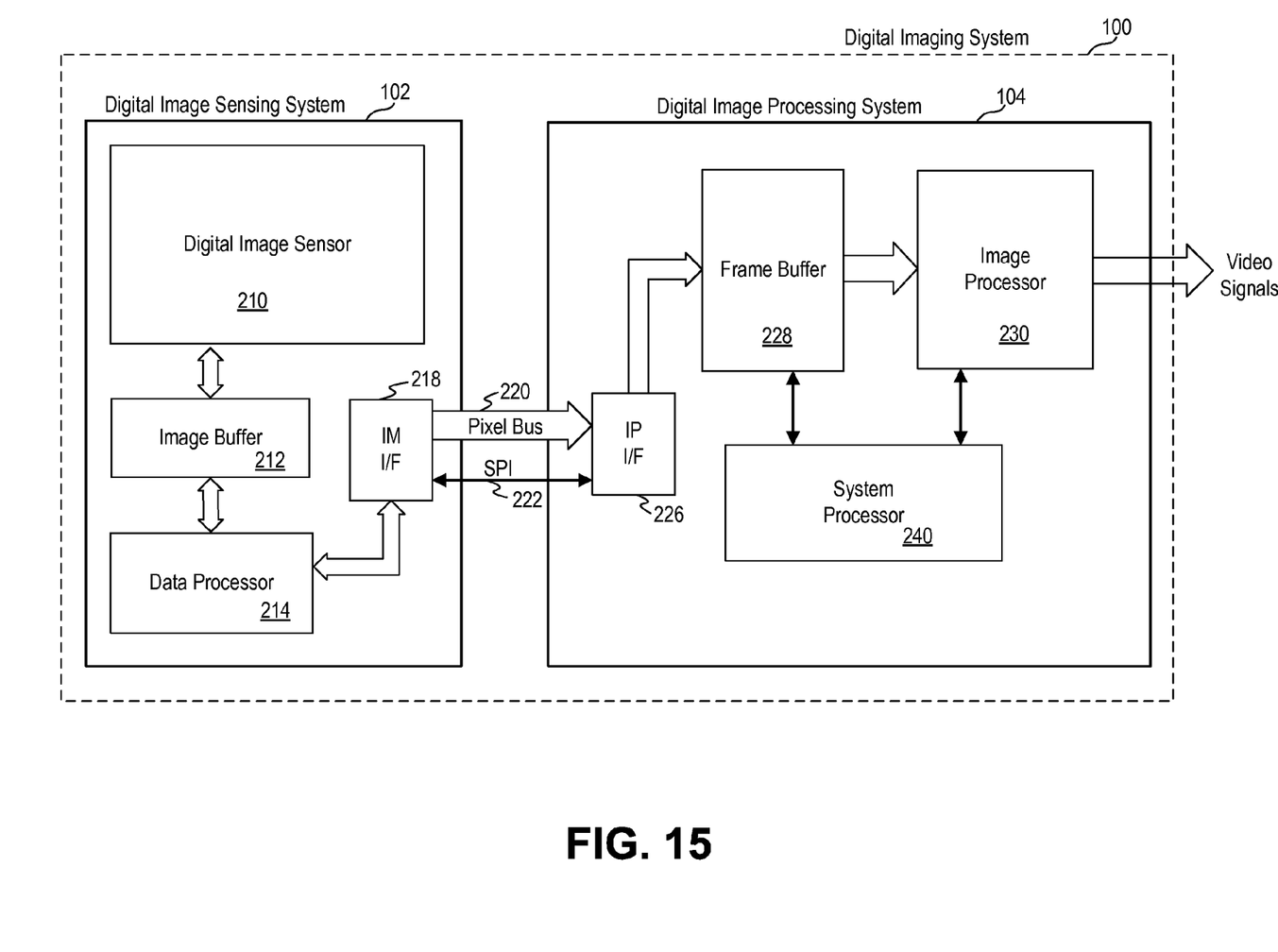
FIG. 15 is a block diagram illustrating a digital imaging system in which the IR notch filter and the RGBGr image sensor can be applied according to one embodiment of the present invention.

FIG. 15 is a block diagram illustrating a digital imaging system in which the IR notch filter and the RGBGr image sensor can be applied according to one embodiment of the present invention. Referring to FIG. 15, a digital imaging system 100 in accordance with the present embodiment is implemented as a video imaging system. In other embodiments, digital imaging system 100 can be implemented as a still image camera or a motion and still image camera. Digital imaging system 100 includes a digital image sensing subsystem 102 and a digital image processing subsystem 104. Digital image sensing subsystem 102 and digital image processing subsystem 104 can be formed on a single integrated circuit or each subsystem can be formed as an individual integrated circuit. In other embodiments, the digital image sensing subsystem and the digital image processing subsystem can be formed as a multi-chip module whereby each subsystem is formed as separate integrated circuits on a common substrate. In the present embodiment, digital image sensing subsystem 102 and digital image processing subsystem 104 are formed as two separate integrated circuits. In the present description, the terms "digital image sensing system 102" and "digital image processing system 104" will be used to refer to the respective subsystems of digital imaging system 100. The use of the terms "digital image sensing system 102" and "digital image processing system 104" are not intended to limit the implementation of the digital imaging system of the present invention to two integrated circuits only.

In the present embodiment, digital image sensing system 102 is an operationally "stand-alone" imaging subsystem and is capable of capturing and recording image data independent of digital image processing system 104. Digital image sensing system 102 operates to collect visual information in the form of light intensity values using an area image sensor, such as a digital image sensor 210, which includes a two-dimensional array of light detecting elements, also called photodetectors. Digital image sensor 210 collects image data under the control of a data processor 214. At a predefined frame rate, image data collected by digital image sensor 210 are read out of the photodetectors and stored in an image buffer 212. Typically, image buffer 212 includes enough memory space to store at least one frame of image data from digital image sensor 210.

Image data recorded by digital image sensing system 102 is transferred through an image sensor interface circuit (IM I/F) 218 to digital image processing system 104. In the present embodiment, digital image sensing system 102 and digital image processing system 104 communicate over a pixel bus 220 and a serial peripheral interface (SPI) bus 222. Pixel bus 220 is uni-directional and serves to transfer image data from digital image sensing system 102 to digital image processing system 104. SPI bus 222 is a bi-directional bus for transferring instructions between the digital image sensing system and the digital image processing system. In digital imaging system 100, the communication interface between digital image sensing system 102 and digital image processing system 104 is a purely digital interface. Therefore, pixel bus 220 can implement high speed data transfer, allowing real time display of images captured by digital image sensing system 102.

In one embodiment, pixel bus 220 is implemented as a low-voltage differential signaling (LVDS) data bus. By using a LVDS data bus, very high speed data transfer can be implemented. Furthermore, in one embodiment, SPI bus 222 is implemented as a four-wire serial communication and serial flash bus. In other embodiments, SPI bus 222 can be implemented as a parallel bi-directional control interface.

Digital image processing system 104 receives image data from digital image sensing system 102 on pixel bus 220. The image data is received at an image processor interface circuit (IP I/F) 226 and stored at a frame buffer 228. Digital image processing system 104, operating under the control of system processor 240, performs digital signal processing functions on the image data to provide output video signals in a predetermined video format. More specifically, the image data stored in frame buffer 228 is processed into video data in the desired video format through the operation of an image processor 230. In one embodiment, image processor 230 is implemented in part in accordance with U.S. Pat. No. 7,379,105, entitled "A Multi-Standard Video Image Capture Device Using A Single CMOS Image Sensor," of Michael Frank and David Kuo, issued on May 25, 2008 (the '105 patent), which patent is incorporated herein by reference in its entirety. For example, image processor 230 can be configured to perform vertical interpolation and/or color interpolation ("demosaicing") to generate full color video data, as described in the '105 patent.

In accordance with the present invention, image processor 230, under the command of system processor 240, performs 4-channel demosaicing of the RGBGr image data to generate the RGB image enhanced by the IR image and/or generate a separate IR image.

In one embodiment, digital imaging system 100 is implemented using the video imaging system architecture described in U.S. Pat. No. 7,483,058, entitled "Video Imaging System Including A Digital Image Sensor and A Digital Signal Processor," of Michael Frank et al., issued Jan. 27, 2009, which patent is incorporated herein by reference in its entirety.

The output video signals generated by image processor 230 can be used in any number of ways depending on the application. For example, the signals can be provided to a television set for display. The output video signals can also be fed to a video recording device to be recorded on a video recording medium. When digital imaging system 100 is a video camcorder, the TV signals can be provided to a viewfinder on the camcorder.

Digital Image Sensor

Digital imaging system 100 uses a single image sensor to capture video images which are then processed into output video data in the desired video formats. Specifically, digital image sensor 102 includes a digital image sensor 210 of light detecting elements (also called pixels) and generates digital pixel data as output signals at each pixel location. In the present embodiment, digital image sensor 210 is overlaid with the RGBGr color filter array pattern for detecting the visible spectrum and the invisible (IR) spectrum using red, green, blue and gray color filters. Digital image sensing system 102 also includes image buffer 212 for storing at least one frame of digital pixel data from digital image sensor 210 and data processor 214 for controlling the capture and readout operations of the image sensor. Digital image sensing system 102 may include other circuitry not shown in FIG. 15 to support the image capture and readout operations of the image sensor.

Digital image sensor 210 can be implemented as a CMOS or CCD image sensor, or other types of image sensing devices currently available or to be developed. Digital image sensor 210 is overlaid with the IR notch filter and the RGBGr color filter array to realizing imaging of the visible and invisible spectrum. In one embodiment, digital image sensor 210 of digital image sensing system 102 is implemented as a digital pixel sensor (DPS). A digital pixel sensor refers to a CMOS image sensor with pixel level analog-to-digital conversion capabilities. A CMOS image sensor with pixel level analog-to-digital conversion is described in U.S. Pat. No. 5,461,425 of B. Fowler et al. (the '425 patent), which patent is incorporated herein by reference in its entirety. A digital pixel sensor provides a digital output signal at each pixel element representing the light intensity value detected by that pixel element. The combination of a photodetector and an analog-to-digital (A/D) converter in an area image sensor helps enhance detection accuracy, reduce power consumption, and improves overall system performance.

In the present description, a digital pixel sensor (DPS) array refers to a digital image sensor having an array of photodetectors where each photodetector produces a digital output signal. In one embodiment of the present invention, the DPS array implements the digital pixel sensor architecture illustrated in FIG. 16 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed than the conventional image sensor. Of course, other schemes for implementing a pixel level A/D conversion in an area image sensor may also be used in the digital image sensor of the present invention.

Figure 16:
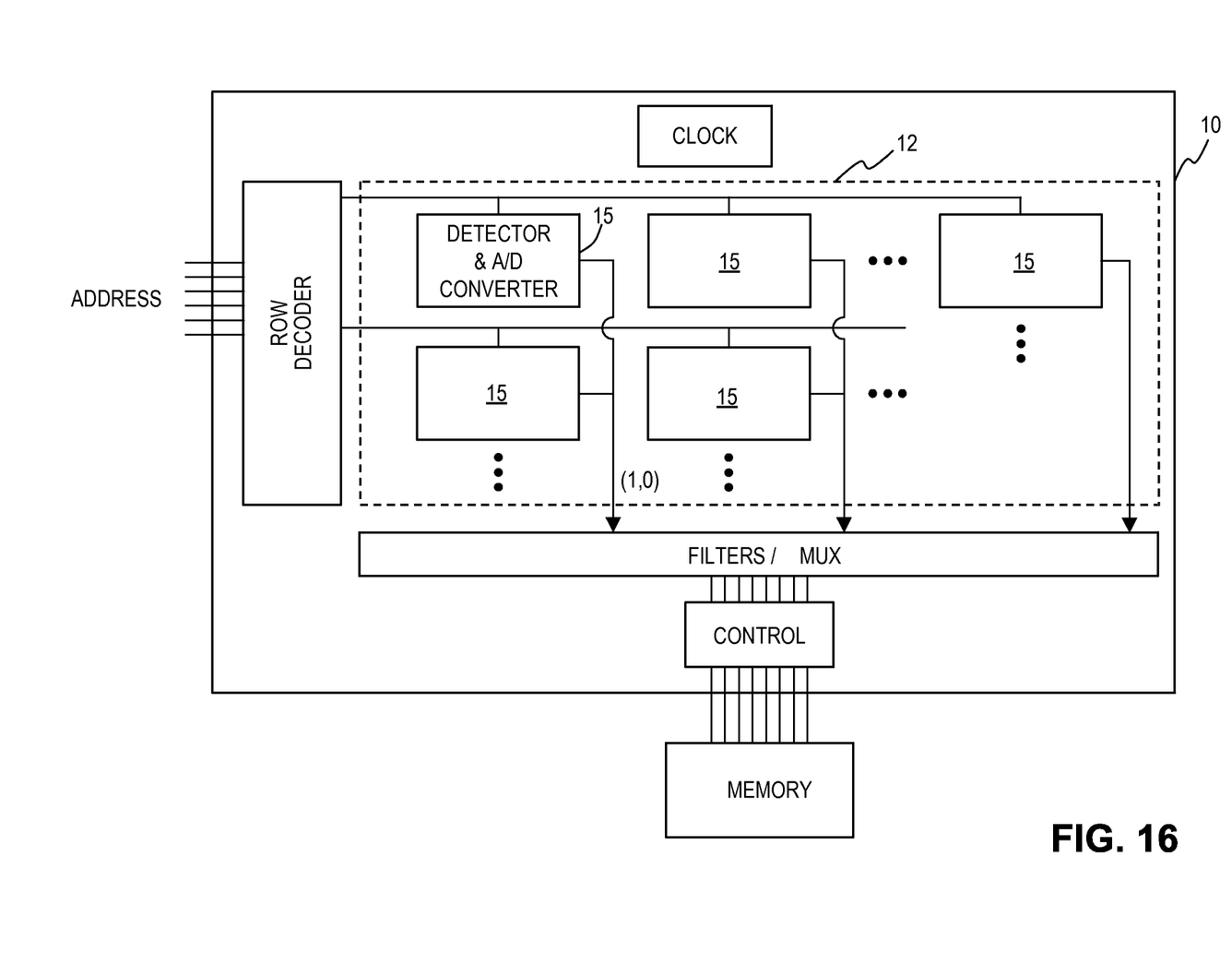
FIG. 16 is a block diagram of a digital pixel sensor as described in U.S. Pat. No. 5,461,425 of Fowler et al.

In the digital pixel sensor architecture shown in FIG. 16, a dedicated ADC scheme is used. That is, each of pixel elements 15 in sensor array 12 includes an ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetectors by multiplexing between the four photodetectors. The shared ADC architecture retains all the benefits of a pixel level analog-to-digital conversion while providing the advantages of consuming a much smaller circuit area, thus reducing manufacturing cost and improving yield. Above all, the shared ADC architecture allows a higher fill factor so that a larger part of the sensor area is available for forming the photodetectors.

In one embodiment of the present invention, the ADC circuit of each digital pixel or each group of digital pixels is implemented using the Multi-Channel Bit Serial (MCBS) analog-to-digital conversion technique described in U.S. Pat. No. 5,801,657 of B. Fowler et al. (the '657 patent), which patent is incorporated herein by reference in its entirety. The MCBS ADC technique of the '657 patent can significantly improve the overall system performance while minimizing the size of the ADC circuit. Furthermore, as described in the '657 patent, a MCBS ADC has many advantages applicable to image acquisition and more importantly, facilitates high-speed readout.

Returning to FIG. 15, in the present embodiment, digital image sensing system 102 includes image buffer 212 as an on-chip memory for storing at least one frame of pixel data. However, in other embodiments, digital image sensing system 102 can also operate with an off-chip memory as the image buffer. The use of on-chip memory is not critical to the practice of the present invention. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. U.S. Pat. No. 6,975,355, entitled "Multiple Sampling via a Time-indexed Method to Achieve Wide Dynamic Ranges," of David Yang et al., issued Dec. 13, 2005, describes a method for facilitating image multiple sampling using a time-indexed approach. The '355 patent is incorporated herein by reference in its entirety.

Figure 17:
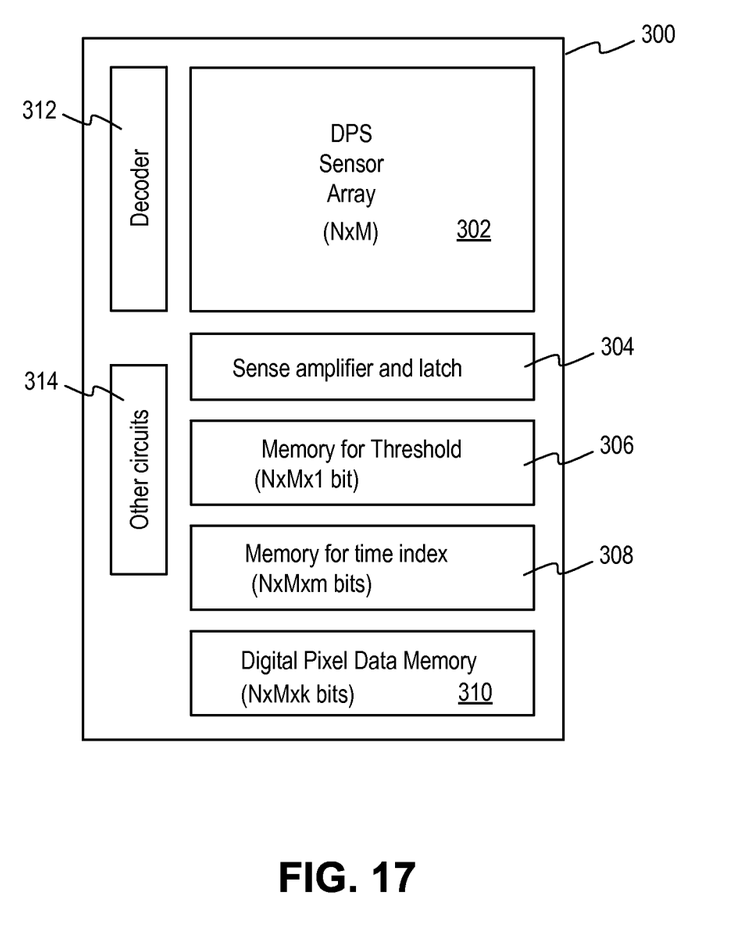
FIG. 17 is a functional block diagram of an image sensor as described in U.S. Pat. No. 6,975,355 of Yang et al.

FIG. 17 duplicates FIG. 3 of the '355 patent and shows a functional block diagram of an image sensor 300 which may be used to implement digital image sensing system 102 in one embodiment. The operation of image sensor 300 using multiple sampling is described in detail in the '355 patent. Image sensor 300 includes a DPS sensor array 302 which has an N by M array of pixel elements. Sensor array 302 employs either the dedicated ADC scheme or the shared ADC scheme and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. The exposure time indicating when the light intensity measured by each pixel has passed the threshold level is stored in time index memory 308. As a result of this memory configuration, each pixel element in sensor array 302 can be individually time-stamped by threshold memory 306 and time index memory 308 and stored in digital pixel data memory 310.

A DPS image sensor employing multiple sampling is capable of recording 14 to 16 or more bits of dynamic range in the captured image, in contrast with the 10 bits of dynamic range attainable by conventional image sensors. In one embodiment, digital image sensing system 102 is implemented using a DPS image sensor and is further implemented using the architecture of image sensor 300 of FIG. 10 to support multiple sampling for attaining a high dynamic range in image capture. More importantly, the high dynamic range image can be maintained throughout the interpolation process such that the resultant video data can have a high dynamic range, regardless of the video format.

In another embodiment of the present invention, the ADC circuit of each digital pixel or each group of digital pixels implements a thermometer-code analog-to-digital conversion technique with continuous sampling of the input signal for achieving a digital conversion with a high dynamic range. A massively parallel thermometer-code analog-to-digital conversion scheme is described in U.S. Pat. No. 7,362,365, entitled "Digital Image Capture having an Ultra-high Dynamic Range," of Justin Reyneri et al., issued Apr. 22, 2008, which patent is incorporated herein by reference in its entirety.

Digital Image Processor

Digital image processing system 104 is a high performance image processor for processing pixel data from digital image sensing system 102 into video images in a desired video format. In the present embodiment, digital image processor 104 implements signal processing functions for supporting an entire video signal processing chain. Specifically, the image processing functions of digital image processing system 104 include demosaicing, image scaling, and other high-quality video enhancements, including color correction, edge, sharpness, color fidelity, backlight compensation, contrast, and dynamic range extrapolation. The image processing operations are carried out at video rates.

The overall operation of digital image processing system 104 is controlled by system processor 240. In the present embodiment, system processor 240 is implemented as an ARM (Advanced RISC Machine) processor. Firmware for supporting the operation of system processor 240 can be stored in a memory buffer. A portion of frame buffer 228 may be allocated for storing the firmware used by system processor 240. System processor 240 operates to initialize and supervise the functional blocks of image processing system 104.

The above detailed descriptions are provided to illustrate specific embodiments of the present invention and are not intended to be limiting. Numerous modifications and variations within the scope of the present invention are possible. The present invention is defined by the appended claims.

I claim:
1. An image sensing system, comprising:
an IR notch filter configured to block transmission of spectral energy having wavelengths in an interface region between the visible spectrum and the invisible spectrum and enable transmission of spectral energy having wavelengths in at least the visible spectrum and the near-infrared (IR) spectrum;

a digital image sensor comprising a two-dimensional array of pixel elements, the digital image sensor configured to generate output signals at each pixel element as pixel data representing an image of a scene; and a color filter array comprising a two-dimensional array of selectively transmissive filters superimposed on and in registration with the two-dimensional array of pixel elements, the color filter array comprising a first group of selectively transmissive filters disposed to transmit spectral energy in one or more colors of the visible spectrum and a second group of gray color filters disposed to transmit spectral energy in at least the near-infrared (IR) spectrum, wherein the IR notch filter is configured to block transmission of spectral energy having wavelengths between approximately 650 nm and approximately 780 nm, and wherein the IR notch filter is configured to further block transmission of spectral energy having wavelengths above approximately 950 nm.

2. The image sensing system of claim 1, wherein the color filter array is formed by a repeating pattern of a pixel block, the pixel block comprising selectively transmissive filters disposed to transmit spectral energy in the red, green and blue colors of the visible spectrum and a gray color filter disposed to transmit spectral energy in the infrared spectrum.

3. The image sensing system of claim 1, wherein the gray color filter is formed using a linear combination of the red, green and blue color filters.

4. The image sensing system of claim 3, wherein the gray color filter is manufactured using the same material as the red, green and blue color filters.

5. The image sensing system of claim 1, wherein each of the pixel elements comprises a photodetector generating an output signal, and the image sensing system further comprises:

a plurality of analog-to-digital conversion (ADC) circuits configured to convert the output signal from each pixel element to a digitized pixel voltage signal.

6. The image sensing system of claim 5, wherein the plurality of analog-to-digital conversion (ADC) circuits are located within the image sensor, each of the ADC circuits being connected to one or more photodetectors for converting the output signal of each pixel element to a digitized pixel voltage signal.

7. A digital imaging system, comprising:
the image sensing system according to claim 1;
a data memory in communication with the digital image sensor and configured to store the pixel data; and
a digital image processor in communication with the digital image sensor and the data memory and configured to process the pixel data to generate image data indicative of the image of the scene.

8. The digital imaging system of claim 7, wherein the digital image processor performs four-channel demosaicing to generate a first image using pixel data in the red, green blue colors and a second image using pixel data from the infrared spectrum.

9. An image sensing system, comprising:
an IR notch filter configured to block transmission of spectral energy having wavelengths in an interface region between the visible spectrum and the invisible spectrum and enable transmission of spectral energy having wavelengths in at least the visible spectrum and the near-infrared (IR) spectrum;
a digital image sensor comprising a two-dimensional array of pixel elements, the digital image sensor configured to generate output signals at each pixel element as pixel data representing an image of a scene; and a color filter array comprising a two-dimensional array of selectively transmissive filters superimposed on and in registration with the two-dimensional array of pixel elements, the color filter array comprising a first group of selectively transmissive filters disposed to transmit spectral energy in one or more colors of the visible spectrum and a second group of gray color filters disposed to transmit spectral energy in at least the near-infrared (IR) spectrum, wherein the gray color filter is formed using a linear combination of the red, green and blue color filters, and wherein the gray color filter transmits spectral energy in the red, green and blue colors of the visible spectrum at 30% intensity and transmits spectral energy of the infrared spectrum at wavelengths above about 780 nm.

10. A digital imaging system, comprising:
the image sensing system according to claim 9;
a data memory in communication with the digital image sensor and configured to store the pixel data; and
a digital image processor in communication with the digital image sensor and the data memory and configured to process the pixel data to generate image data indicative of the image of the scene.

11. The digital imaging system of claim 10, wherein the digital image processor performs four-channel demosaicing to generate a first image using pixel data in the red, green blue colors and a second image using pixel data from the infrared spectrum.

12. The image sensing system of claim 9, wherein the color filter array is formed by a repeating pattern of a pixel block, the pixel block comprising selectively transmissive filters disposed to transmit spectral energy in the red, green and blue colors of the visible spectrum and a gray color filter disposed to transmit spectral energy in the infrared spectrum.

13. The image sensing system of claim 9, wherein the gray color filter is formed using a linear combination of the red, green and blue color filters.

14. The image sensing system of claim 13, wherein the gray color filter is manufactured using the same material as the red, green and blue color filters.

15. The image sensing system of claim 9, wherein each of the pixel elements comprises a photodetector generating an output signal, and the image sensing system further comprises:

a plurality of analog-to-digital conversion (ADC) circuits configured to convert the output signal from each pixel element to a digitized pixel voltage signal.

16. The image sensing system of claim 15, wherein the plurality of analog-to-digital conversion (ADC) circuits are located within the image sensor, each of the ADC circuits being connected to one or more photodetectors for converting the output signal of each pixel element to a digitized pixel voltage signal.

17. A method for sensing an image of a scene comprising:
receiving incident light at a digital image sensing system;
blocking transmission of spectral energy having wavelengths in an interface region between the visible spectrum and the invisible spectrum while enabling transmission of spectral energy having wavelengths in at least the visible spectrum and the near-infrared (IR) spectrum;
blocking transmission of spectral energy having wavelengths between approximately 650 nm and approximately 780 nm;

sensing the incident light at a digital image sensor overlaid with a color filter array, comprising:
  sensing the incident light using a first group of selectively transmissive filters disposed to transmit spectral energy in one or more colors of the visible spectrum; and
  sensing the incident light using a second group of gray color filters disposed to transmit spectral energy in at least the near-infrared (IR) spectrum; and
generating output signals at each pixel element of the digital image sensor as pixel data representing an image of a scene.

18. The method of claim 17, wherein blocking transmission of spectral energy having wavelengths in an interface region between the visible spectrum and the invisible spectrum while enabling transmission of spectral energy having wavelengths in at least the visible spectrum and the near-infrared (IR) spectrum comprises:
  blocking transmission of spectral energy having wavelengths in an interface region between approximately 650 nm and approximately 780 nm.

19. The method of claim 18, wherein blocking transmission of spectral energy having wavelengths in an interface region between the visible spectrum and the invisible spectrum while enabling transmission of spectral energy having wavelengths in at least the visible spectrum and the near-infrared (IR) spectrum further comprises blocking transmission of spectral energy having wavelengths above approximately 950 nm.

20. The method of claim 17, wherein sensing the incident light at a digital image sensor overlaid with a color filter array comprises:
  sensing the incident light using a color filter array formed by a repeating pattern of a pixel block, the pixel block comprising selectively transmissive filters disposed to transmit spectral energy in the red, green and blue colors of the visible spectrum and a gray color filter disposed to transmit spectral energy in the infrared spectrum.

21. A method for sensing an image of a scene comprising:
receiving incident light at a digital image sensing system;
blocking transmission of spectral energy having wavelengths in an interface region between the visible spectrum and the invisible spectrum while enabling transmission of spectral energy having wavelengths in at least the visible spectrum and the near-infrared (IR) spectrum;
sensing the incident light at a digital image sensor overlaid with a color filter array, comprising:
  sensing the incident light using a first group of selectively transmissive filters disposed to transmit spectral energy in one or more colors of the visible spectrum; and
  sensing the incident light using a second group of gray color filters disposed to transmit spectral energy in at least the near-infrared (IR) spectrum, the gray color filters being disposed to transmit spectral energy in the red, green, and blue colors of the visible spectrum at 30% intensity and transmit spectral energy of the infrared spectrum at wavelengths above about 790 nm; and
generating output signals at each pixel element of the digital image sensor as pixel data representing an image of a scene.

22. The method of claim 21, wherein blocking transmission of spectral energy having wavelengths in an interface region between the visible spectrum and the invisible spectrum while enabling transmission of spectral energy having wavelengths in at least the visible spectrum and the near-infrared (IR) spectrum comprises:
  blocking transmission of spectral energy having wavelengths in an interface region between approximately 650 nm and approximately 780 nm.

23. The method of claim 22, wherein blocking transmission of spectral energy having wavelengths in an interface region between the visible spectrum and the invisible spectrum while enabling transmission of spectral energy having wavelengths in at least the visible spectrum and the near-infrared (IR) spectrum further comprises blocking transmission of spectral energy having wavelengths above approximately 950 nm.

24. The method of claim 21, wherein sensing the incident light at a digital image sensor overlaid with a color filter array comprises:
  sensing the incident light using a color filter array formed by a repeating pattern of a pixel block, the pixel block comprising selectively transmissive filters disposed to transmit spectral energy in the red, green and blue colors of the visible spectrum and a gray color filter disposed to transmit spectral energy in the infrared spectrum.

25. The method of claim 21, further comprising:
blocking transmission of spectral energy having wavelengths between approximately 650 nm and approximately 780 nm.

* * * * *